Patented Jan. 14, 1947

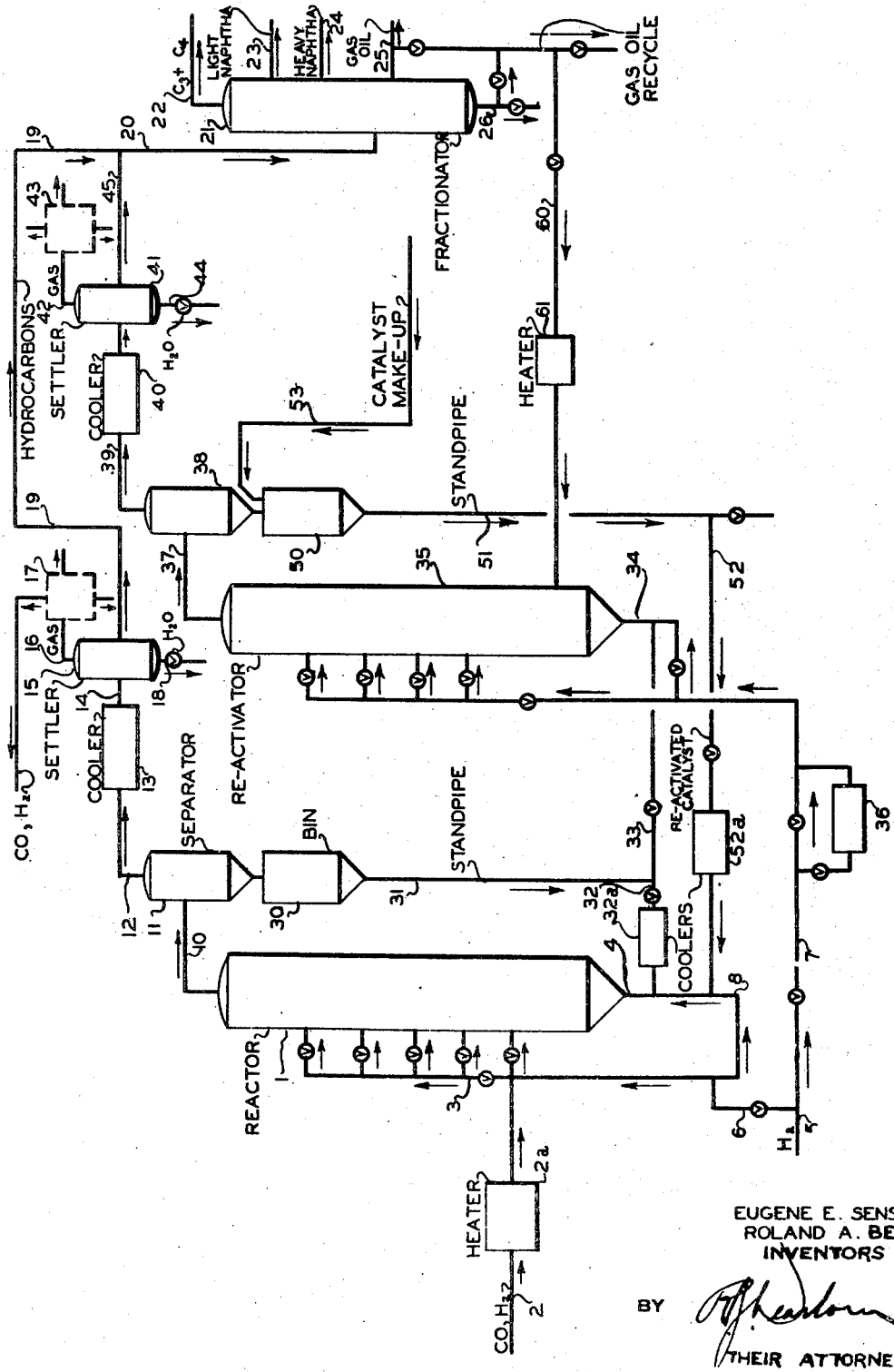

2,414,276

UNITED STATES PATENT OFFICE 2,414,276

CATALYTIC CONVERSION PROCESS

Eugene E. Sensel, Beacon, and Roland A. Beck, Glenham, N. Y., assignors, by mesne assignments, to The Texas Company, New York, N. Y., a corporation of Delaware Application August 28, 1943, Serial No. 500,380

5 Claims. (Cl. 260—449.6)

This invention relates to a continuous catalytic conversion process such as the hydrogenation of oxides of carbon to produce valuable products.

The invention has to do with a continuous process for catalytically hydrogenating an oxide of carbon by the action of a solid catalyst in powdered form involving continuous reactivation of used catalyst in the presence of hydrogen under elevated temperature, the reactivated catalyst being returned to the reaction zone.

The invention is particularly applicable to the hydrogenation of carbon monoxide to produce hydrocarbons and oxygenated derivatives thereof. The hydrogenation reaction is carried out by subjecting the reactant gases to contact with a catalyst maintained as a powder suspended in the reactant gases undergoing conversion. The process is carried out under substantially continuous flow conditions with continuous withdrawal of at least a portion of the catalyst from the reaction zone, reactivation of the withdrawn catalyst and return of the reactivated catalyst to the reaction zone.

A feature of the invention involves effecting the reactivation in the presence of hydrocarbons of higher molecular weight than naphtha so as to effect simultaneous reactivation of the catalyst and cracking of the higher molecular weight hydrocarbons. The higher molecular weight hydrocarbons may be obtained in the process itself or from an extraneous source.

In the manufacture of synthetic hydrocarbons by the process of this invention carbon monoxide and hydrogen are subjected to intimate contact with powdered hydrogenation catalyst suspended within the reactant gases. A stream of hydrocarbon reaction products is continuously withdrawn from the reaction zone and, after removal of entrained catalyst and also water produced in the reaction, is subjected to fractionation, the fractionation usually involving separation into normally gaseous, naphtha and higher boiling hydrocarbon fractions. Used catalyst powder containing adsorbed hydrocarbons in the kerosene and gas oil range and wax is withdrawn from the reaction zone and passed through a separate reactivating zone from which it is recycled all or in part to the reaction zone.

Relatively heavy hydrocarbons such as gas oil, paraffin wax or mixtures thereof, or fractions of predominantly paraffinic character may be passed to the reactivation zone wherein they are subjected to conversion in the presence of the used catalyst powder undergoing reactivation therein. Hydrogen is continuously passed through the reactivation zone, which zone is maintained under elevated temperatures such that cracking of the hydrocarbons passing through the reactivation zone occurs, including cracking of hydrocarbons which are deposited on or contained in the used catalyst as withdrawn from the reaction zone, with the production of normally gaseous and normally liquid hydrocarbons including gasoline hydrocarbons.

It is thus contemplated utilizing the catalyst to effect "hydrogen cracking" of the hydrocarbon material adsorbed thereon, as well as the hydrocarbons separately introduced to the reactivation zone.

The products of the cracking reaction may be separately fractionated or on the other hand mixed with the hydrocarbon products from the synthesis reaction and the resulting mixture fractionated. In any event the higher boiling products of the cracking reaction may be recycled all or in part to the reactivation zone.

The reactivated catalyst is continuously drawn off from the reactivation zone and returned to the synthesis reaction zone.

In order to describe the invention in more detail reference will now be made to the accompanying drawing comprising a diaphragm of flow illustrating one mode of practicing the process of the invention.

Referring to the drawing the numeral 1 designates a vertical reaction tower adapted for maintaining the hydrogenation catalyst dispersed in powdered form throughout the body of reactant gases undergoing reaction.

Carbon monoxide and hydrogen from a source not shown are conducted through a pipe 2 and heater 2a from which the gas passes to a manifold pipe 3 which in turn communicates with a plurality of branch pipes through which the gas may be introduced at a plurality of successive points in the reactor 1. The carbon monoxide and hydrogen gas is heated to slightly below the reaction temperature during passage through the heater 2a.

The powdered catalyst is continuously injected to the bottom of the reactor through a conduit 4 from a source to which reference will be made later.

Additional hydrogen, if required, may be drawn from a source not shown and conducted through a pipe 5 which communicates with branch pipes 6 and 7. Hydrogen passing through the branch pipe 6 may be heated in a heater not shown and may be introduced through the manifolding pipe 3 to the reactor 1. Such additional hydrogen may of course be supplied to the pipe 2 for the necessary heating in the heater 2a.

The proportion of hydrogen introduced to the reactor 1 will amount to about 2 mols of hydrogen to 1 mol of carbon monoxide, although the exact proportions may be varied depending upon the catalyst employed and the nature of the product desired.

All or a portion of the entering carbon monoxide and hydrogen may be introduced through the pipe 8 leading to the previously mentioned conduit 4 so as to provide a gas jet with which to propel the powdered catalyst through the conduit 4 into the reactor 1.

The velocity of gas flow is adjusted so that the catalyst powder is completely dispersed throughout the body of gases rising through the reactor 1.

An effluent stream of gas, hydrocarbon products and powder catalyst is continuously drawn off from the top of the reactor through a conduit 10 leading to a separating zone 11 which may comprise one or more units adapted to effect removal of catalyst powder from the gas and vapor mixture leaving the conduit 10. For example, the effluent stream may pass first through a conventional dust separator wherein solid particles are separated by centrifugal action. The effluent hydrocarbon gas stream from the centrifugal separator may then pass through an electrical or magnetic precipitator wherein remaining particles of dust are removed from the gas stream.

The gas and hydrocarbon stream from which the catalyst particles have been separated is then conducted through a pipe 12 and cooler-condenser 13 wherein the stream is cooled to effect condensation of normally liquid products of reaction.

The cooled stream then passes through pipe 14 to a settler 15 wherein gaseous constituents including unreacted carbon monoxide and hydrogen are released through a pipe 16 leading to an absorption unit 17 which may be of conventional type.

For example the gases may be passed through activated charcoal absorbers for the purpose of removing hydrocarbon gases and vapors and the like therefrom. The resulting carbon monoxide-hydrogen mixture substantially free from hydrocarbons higher than methane and other materials may be recycled to the reactor 1 to supplement or form part of the carbon monoxide and hydrogen entering the reactor.

In the settler 15 separation into two liquid phases may occur, the lower phase being a water layer comprising water formed as a product of the synthesis reaction. This water may be discharged from the system through the pipe 18.

The other liquid phase will comprise normally liquid hydrocarbon products of the reaction and these hydrocarbons are continuously drawn off through a pipe 19 communicating with a pipe 20 leading to a fractionator 21.

The fractionator 21 may comprise one or more fractionating towers through which the hydrocarbon mixture may flow in succession so as to separate the hydrocarbon mixture into any desired number of fractions of any desired character.

For example, a gaseous fraction consisting essentially of hydrocarbons having about 3 to 4 carbon atoms per molecule may be drawn off through a pipe 22. A light naphtha fraction may be withdrawn through a pipe 23 and a heavier naphtha fraction through a pipe 24. A distillate gas oil fraction may be drawn off through a pipe 25 and a higher boiling residual fraction may be removed from the fractionating unit through a pipe 26.

Referring again to the separator 11, the catalyst powder removed from the effluent stream of reaction products is accumulated in a bin 30 advantageously surmounting a standpipe 31 in which the powdered catalyst accumulates.

If desired a portion of the powdered catalyst may be conducted from the bottom of the standpipe through a conduit 32 and cooling zone 32a communicating with the previously mentioned conduit 4. Although not indicated in the drawing provision may be made for injecting a stream of gas into the conduit 32 for the purpose of propelling the catalyst powder into the reactor 1.

Preferably, however, all or a portion of the catalyst from the standpipe 31 is propelled through a conduit 33 which communicates with a conduit 34 leading to the bottom of a reactivator 35.

The reactivator 35 may be somewhat similar to the reactor 1, being adapted to provide intimate contact between the catalyst powder and the stream of hydrocarbon and gas vapors passing through the reactivator.

The catalyst entering the reactivator is contaminated with a small amount of heavy paraffinic material, usually of a waxy nature. The function of the reactivator is to effect removal of this paraffinic material from the catayst so that activity of the catayst is restored.

A stream of hydrogen conducted from the pipe 7 is passed into the reactivator 35. It may be introduced at a plurality of succeeding points and at least a substantial portion thereof is jetted into the conduit 34 for the purpose of propelling the used catalyst into the reactivator.

Temperature conditions are maintained within the reactivator sufficiently high to effect the previously mentioned "hydrogen cracking" of the paraffinic material deposited or contained in the catalyst particles as well as the hydrocarbons separately introduced. The temperatures prevailing in the reactivator 35 may approximate those emplayed in the reactor 1 although the temperature may be in the range about 500 to 800° F.

The stream of hydrogen flowing through the pipe 7 may pass through a suitable heater 36 for the purpose of supplying a portion of the heat required for effecting the reactivating treatment.

The stream of reactivated catalyst and products of the cracking reaction together with excess hydrogen is drawn off from the top of the reactivator 35 through a conduit 37 leading to a separating unit 38 which may be somewhat similar to that already described for effecting removal of catalyst powder from the effluent vapors and gases.

The effluent gases and vapors are continuously drawn off through a pipe 39 and cooler 40 to a settler 41.

In the settler 41 the separation into gas and liquid phases is somewhat similar to that occurring in the settler 15. Likewise the gaseous fraction removed in the settler through the pipe 42 may be passed to a suitable absorption or other recovery unit 43 to effect removal of moisture and gaseous hydrocarbons from the hydrogen or other gases. The hydrogen substantially free from contaminating material may then be recycled to the pipe 5.

Any water present is discharged from the settler through a pipe 44 while the hydrocarbon layer is drawn off through a pipe 45 communicating with the previously mentioned pipe 20 through which the cracked hydrocarbons are passed to the fractionation unit 21.

The reactivated catalyst separated in the separating unit 38 accumulates in a bin 50 advantageously surmounting a standpipe 51 which communicates through a conduit 52 and cooling zone 52a with the previously mentioned conduit 4. In this way the reactivated catalyst may be returned all or in part to the reactor 1.

Any make-up catalyst required may be added to the system from a source not shown through a pipe 53 leading to the previously mentioned bin 50.

According to the method of flow thus described the hydrocarbon products of both the synthesis reaction and the reactivating treatment are passed to a common fractionating unit. However, it is contemplated that separate fractionation units may be employed if desired.

Any portion of the hydrocarbon products boiling above naphtha may be recycled from the fractionating unit 21 through a pipe 60 and heater 61 to the reactivator 35, wherein the recycled higher boiling oil is subjected to cracking at elevated temperature in the presence of hydrogen.

The powdered catalyst used may comprise about 32% cobalt, 64% diatomaceous earth (Filter Cel) and about 4% thorium and magnesium oxides. However, it is contemplated that the catalyst may be composed of other substances, for example, iron or nickel may be used instead of cobalt, fuller's earth or silica gel in place of Filter Cel and other promoters in place of thorium oxide as, for example, the oxides of magnesium, uranium and vanadium.

The temperature maintained within the reactor 1 will depend in part upon the type of catalyst employed and the products desired. When producing hydrocarbon products with a catalyst of the cobalt type the temperature will usually be in the range about 320 to 420° F. However, it is contemplated that temperaturs ranging from 250 to 750° F. may be employed and likewise the pressure within the reactor 1 may vary from atmospheric to as high as 3000 pounds.

The temperatures prevailing in the reactivator are on the average approximately equivalent to or somewhat higher than those prevailing in the reactor 1 and may be about 320 to 800° F., the pressure ranging from about atmospheric to 3000 pounds per square inch gauge. At any rate conditions are maintained within the reactivator 35 so as to effect substantial fragmentation of the higher boiling hydrocarbons into lower boiling hydrocarbons.

If desired, normally gaseous hydrocarbons including the $C_3$ and $C_4$ hydrocarbons discharged through the pipe 22 may be recycled all or in part through the reactivator 35. A portion of these hydrocarbons may be recycled through the reactor 1. It may be desirable to recycle olefinic constituents of these normally gaseous hydrocarbons to the reactor 1. Such recycled gases may be used for propelling the powdered catalyst streams into the reaction zones.

While mention has been made of recycling the gas oil fraction of the products of reaction to the reactivator 35 nevertheless it is contemplated that other fractions, for example, heavy naphtha, kerosene and Diesel oil fractions may be so recycled.

In connection with the drawing the hydrogenation of carbon monoxide has been specifically described. However, it is contemplated that the feed gas may contain carbon dioxide as well as carbon monoxide.

The reaction in the reactor 1 may be carried out in the presence of other additive materials besides olefins. For example, paraffin hydrocarbons, naphthenes, aromatics or mixtures thereof may be separately introduced to the reactor 1 or may be incorporated in the entering reactant gas stream.

It is also contemplated that the method of operation described may be applied with modifications so as to produce oxygenated compounds. as, for example, by employing somewhat higher temperature and pressure conditions in the reaction, and different catalysts if desired.

It is contemplated that provision will be made for removing the exothermic heat of the reaction. This can be done by cooling the catalyst stream prior to its return to the reaction zone as already indicated.

On the other hand cooling elements may be provided within the reactor 5 through which a suitable cooling fluid is circulated.

The reactor 1 and the reactivator 35 may be of any suitable design. For example, they may comprise vertical vessels of progressively decreasing cross-sectional area so as to maintain a constant up-flow gas velocity therethrough, the reduction in cross-sectional area being such as to compensate for the reduction in volume of flowing gas due to reaction.

While concurrent upward flow of catalyst powder and reactant gases is illustrated in the drawing nevertheless it is contemplated that the catalyst powder may be introduced to the upper portion of the reactor while the reactant gases are introduced to the lower portion thereof.

The reactor and reactivator may also be arranged so the catalyst powder is jetted into the lower portion thereof and the bulk of the catalyst drawn off from the bottom.

As previously mentioned, provision may be made for injecting the gaseous reactants to the reactor and reactivator at successive points. In this way the volume of gas injected may be proportioned so as to offset any reduction in volume of the reaction gases as they advance through the reaction zone. The previously mentioned additive materials may likewise be injected at successive points to aid in maintaining substantially constant gas volume flow through all points of the vessel.

Obviously many modifications and variations of the invention, as hereinbefore set forth, may be made without departing from the spirit and scope thereof, and therefore only such limitations should be imposed as are indicated in the appended claims.

We claim:

1. In the continuous catalytic hydrogenation of an oxide of carbon to form compounds having two or more carbon atoms per molecule by contact with a solid hydrogenation catalyst in powdered form, the steps which comprise continuously passing powdered catalyst to a reaction zone, said catalyst having the approximate composition 64% diatomaceous earth, 32% cobalt, and 4% thorium and magnesium oxides, subjecting it therein to contact with an oxide of carbon and hydrogen under conditions such that the oxide is hydrogenated to form normally gaseous and normally liquid compounds, continuously withdrawing reaction products and powdered catalyst from the reaction zone, fractionating from the products of reaction, a naphtha fraction and a gas oil fraction, passing the withdrawn catalyst to a reactivating zone, passing at least a portion of said gas oil fraction to the reactivation zone, subjecting the catalyst and gas oil fraction to elevated temperature in the range about 500 to 800° F. in the presence of hydrogen in the reactivating zone whereby the gas oil fraction is subjected to cracking and the catalyst is reactivated, withdrawing the reactivated catalyst and returning it to the reaction zone.

2. The method according to claim 1 in which the products of the cracking reaction are commingled with the products produced from the hydrogenation of the oxide prior to fractionation.

3. The method according to claim 1 in which the oxide of carbon is carbon monoxide.

4. In the catalytic hydrogenation of carbon monoxide to form hydrocarbon compounds having two or more carbon atoms per molecule by contact with a solid hydrogenation catalyst in powdered form, the method which comprises continuously passing powdered catalyst to a reaction zone, said catalyst having the approximate composition 64% diatomaceous earth, 32% cobalt, and 4% thorium and magnesium oxides, subjecting it therein to contact with carbon monoxide and hydrogen under conditions such that the oxide is hydrogenated to form normally gaseous hydrocarbons and normally liquid hydrocarbons including naphtha and higher boiling normally liquid hydrocarbons, continuously withdrawing hydrocarbon reaction products and powdered catalyst from the reaction zone, subjecting the withdrawn hydrocarbon products to fractionation in a fractionating zone thereby forming a naphtha fraction and a gas oil fraction, passing the withdrawn catalyst to a reactivating zone, passing at least a portion of said gas oil fraction to the reactivating zone, subjecting the catalyst and gas oil fraction in the reactivating zone to elevated temperatures in the range of about 500 to 800° F. in the presence of hydrogen such that at least a portion of the gas oil is cracked, removing the cracked products, passing resulting hydrocarbon products of cracking to the aforesaid fractionating zone, and returning the catalyst from the reactivating zone to the reaction zone.

5. A continuous process for the manufacture of naphtha hydrocarbons which comprises reacting carbon monoxide and hydrogen with a synthesis catalyst comprising about 64% diatomaceous earth, 32% cobalt, and 4% thorium and magnesium oxides, at a temperature in the range about 320 to 420° F. so as to form synthetic normally liquid hydrocarbons boiling in the range of naphtha and gas oil, passing the synthetic hydrocarbons to a fractionating zone, effecting fractionation therein of said synthetic hydrocarbons to form a naphtha fraction and a heavier fraction comprising gas oil hydrocarbons, separately removing said fractions from the fractionating zone, passing said heavier fraction at least in part to a cracking zone, subjecting it therein to contact with used synthesis catalyst of the aforesaid composition at a temperature in the range about 500 to 800° F. such that substantial conversion of said heavier fraction into lower boiling hydrocarbons occurs, passing resulting hydrocarbon products of cracking to said fractionating zone, and effecting fractionation therein of the cracked products in the presence of said synthetic hydrocarbons.

EUGENE E. SENSEL.
ROLAND A. BECK.